Nov. 24, 1959     J. L. EDELEN     2,914,178
MAGNETIC FILTER
Original Filed Nov. 9, 1953

*INVENTOR.*
JAMES L. EDELEN
BY George R. Ericson
ATTORNEY

United States Patent Office 2,914,178
Patented Nov. 24, 1959

2,914,178

MAGNETIC FILTER

James L. Edelen, Kirkwood, Mo., assignor to ACF Industries, Incorporated, New York, N.Y., a corporation of New Jersey Continuation of application Serial No. 391,068, November 9, 1953. This application January 7, 1957, Serial No. 632,914

3 Claims. (Cl. 210—222)

This application is a continuation of my copending application, Serial No. 391,068, filed November 9, 1953, now abandoned.

The present invention relates generally to fluid filters and more particularly to a fluid filter incorporating a novel magnet assembly adapted to withdraw extraneous solid magnetic particles from a fluid stream.

Briefly, the invention contemplates a filter of generally conventional type comprising a head, a removable bowl compressively retained against the head, and a removable filter element disposed within the bowl and also compressively retained within the head. The head itself is provided with an inlet and an outlet and, in addition, is formed with internal passages which communicate the inlet and outlet independently with the attached bowl. Thus, there exists a flow path from the inlet through the bowl to the outlet. The filter element is disposed in this flow path in a manner such that all of the fluid must pass through it in traversing the indicated flow path from inlet to outlet.

Filters of the above type are used extensively in fluid flow lines wherever it is necessary to eliminate foreign matter, the character of the filter element being, of course, the determining factor in its efficiency to perform this function. Filters of the above type are used for separating immiscible liquids, particularly where small amounts of a contaminating liquid may appear immiscibly in another liquid having a specified use. An example of this latter condition is the not uncommon occurrence of water in gasoline intended for use as fuel in internal combustion engines. Filter elements adapted to pass one liquid and, at the same time, to exclude an immiscible liquid are, of course, old in the filtering art. Adapted to perform this function, filter elements must of necessity be pervious, and in the commercial forms these filter elements do not inhibit the passage of extremely small solid particles in addition to the filtered fluid. Thus, a filter used for eliminating water in an automotive fuel system may still pass minute particles of solid matter.

It has been found, however, particularly in automotive fuel systems, that it is important to consider, not only the size of solid particles which may be retained in the filtered fuel, but also the chemical nature of these particles. For example, it has been found that solid particles of ferrous metals, notwithstanding the fact that they may be physically too small individually to do any harm, nevertheless an accumulation has a marked deleterious effect upon the operation and maintenance of automotive engines. For example, small valve parts and bearings in the induction system of the engine may be subject to excessive wear or rendered inoperative by such an accumulation. These parts often acquire some magnetism due to machining operations performed thereon or to the flow of fuel therethrough which will attract and hold such ferrous parts until the valve fails to properly seat or the bearing fails to operate. Moreover, the rate of occurrence of ferrous metal particles in present day automotive fuels is more than sufficient to warrant the installation of devices adapted to withdraw such particles from the fuel before it reaches the engine.

For the above reasons, then, the present invention contemplates the provision, in a mechanical filter of the general type aforementioned, of a permanent magnet to withdraw ferrous metal particles from a stream of filtered fluid. The permanent magnet to be thus employed forms, in the present invention, a part of a novel magnet assembly adapted to be retained in the outlet passage of the filter head through spring-induced wedging action.

Thus, it is an object of the present invention to provide a novel filter head which incorporates a permanent magnet in an outlet passage therein.

It is another object of the invention to provide a novel magnet assembly which may be quickly and easily inserted in a filter head so as to be retained in the latter through spring-induced wedging action.

It is another object of the invention to provide a novel magnet holder which is formed to engage an appropriately formed filter head in wedging relation, and which is inherently spring-like so as to induce a wedging action upon engaging the filter head.

The foregoing and additional objects and advantages will be apparent from the following description of a specific embodiment of the invention, the description being taken in conjunction with the accompanying drawings, in which.

Figure 2:
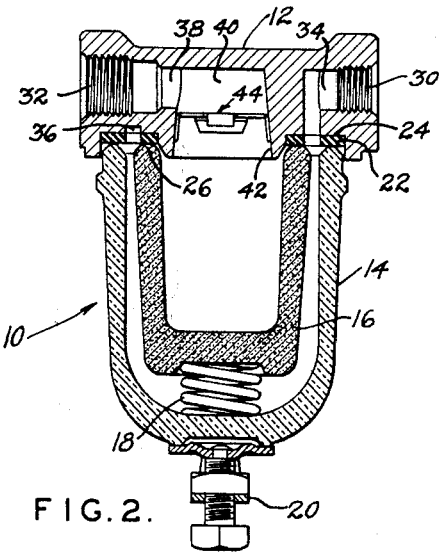
Fig. 2 is a sectional elevation taken generally along the line 2—2 of Fig. 1 and showing the magnet assembly assembled with the filter head.
Figure 1:
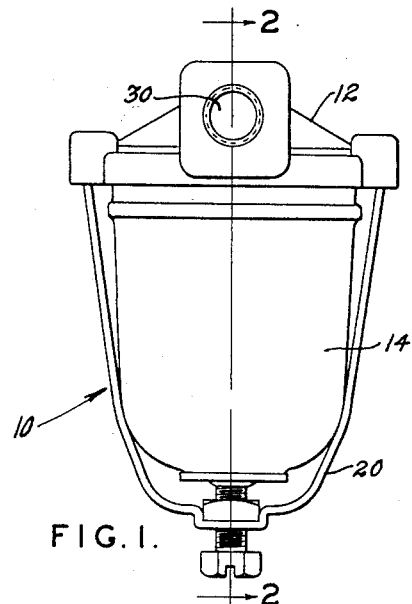
Fig. 1 is an elevational view of a fluid filter in which is incorporated the novel magnet assembly of the present invention.

Referring to the drawing more particularly by means of reference numerals and considering first Figs. 1 and 2, a fluid filter 10 is seen to include a novel filter head 12 in conventional arrangement with a glass bowl 14 and a ceramic filter element 16. The filter element 16, cup-like in form, is disposed within the bowl 14 and rests upon a compression spring 18 which, in turn, rests upon the inside bottom of the bowl 14. The bowl 14 itself is removably supported from the filter head 12 by means of a conventional stirrup assembly 20 adapted to retain the upper rim of the bowl in compressive sealing engagement with the outer portion 22 of an apertured gasket disposed against a recessed shoulder 24 of the filter head 12. Conjointly, the upper rim of the cup-like filter element 16 is pressed, through the action of the spring 18, against the inner portion 26 of the annular gasket 22 disposed against a recessed shoulder 28 of the filter head 12.

The filter head 12 is conventional to the extent that it is provided with an inlet 30 and an outlet 32, the inlet 30 being communicated by means of an internal passage 34 and an annular groove 36 with the space between the bowl 14 and the filter element 16, and the outlet 32 being communicated by means of an internal passage 38 and a central recess 40 with the open upper end of the filter element 16. It will be noted, however, that the instant recess 40 is frusto-conical in shape, as defined by a continuous tapered side wall 42. The frusto-conical recess 40 receives a novel magnet assembly 44 so formed as to engage the side wall 42 at a plurality of different points by wedging action.

Figure 3:
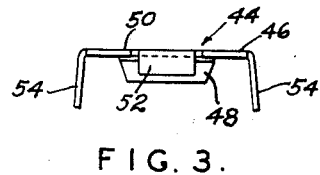
Fig. 3 is an enlarged side elevation of a removed magnet assembly.
Figure 4:
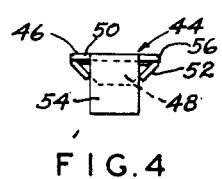
Fig. 4 is an end elevation thereof.
Figure 5:
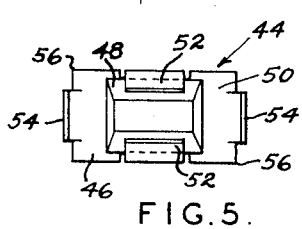
Fig. 5 is a bottom plan view thereof.

Referring now to Figs. 3, 4, and 5, it will be seen that the magnet assembly 44 comprises a holder 46 and a permanent magnet 48. As is apparent from these figures, the holder 46 is of one-piece construction and is preferably formed from a sheet of non-magnetic material having spring-like resiliency for a purpose to appear. Phosphor bronze, for example, has properties well suited to the holder 46.

In its illustrated embodiment, the holder 46 comprises a planar backing plate section 50 in the general form of an elongated rectangle. Centrally of the long sides of this rectangular section 50, opposed tabs 52 are provided for the purpose of retaining the magnet 48 firmly against the backing plate section 50 in a manner which is clear from the drawing. The magnet 48, itself, is preferably block-like in form and, obviously, may have its edges chamfered or beveled as illustrated, or it may be formed to any other generally similar shape.

In addition to the retaining tabs 52, the holder 46 includes opposed centering tabs or guides 54 provided centrally of the short sides of the backing plate section 50 and bent to an angle which, as best illustrated in Fig. 3, is generally complementary to the taper of the aforementioned side wall 42 of the recess 40 in the filter head 12. It will be noted that the centering tabs 54, as well as the retaining tabs 52, are formed so as to leave undisturbed the four corners of the rectangular backing plate section 50. These corners, designated as 56 in the drawings, are not rounded off, but are formed to relatively sharp 90° angles as illustrated.

Figure 6:
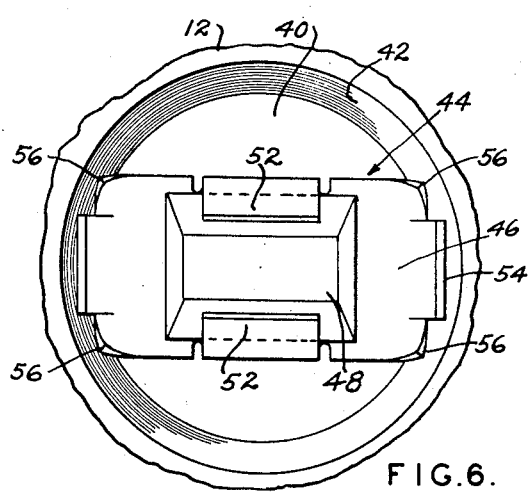
Fig. 6 is a further enlarged bottom plan view of the magnet assembly shown in assembled relation with the filter head, the latter being shown fragmentarily.
Figure 7:
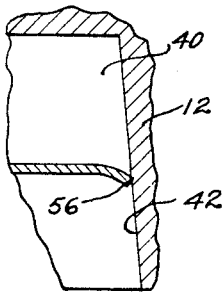
Fig. 7 is a fragmentary side elevation depicting a spring-induced wedged relationship between the magnet assembly and the filter head.

In using the present invention, the magnet assembly 44, formed as herein described and illustrated, the filter and bowl are first removed then the assembly is forced into the recess 40 of the filter head 12 to the approximate position illustrated in Fig. 2, so that centering tabs 54 of the holder 46 will be in snug engagement with the tapered wall 42 of the recess 40. The tabs 54 act to guide the assembly 44 into proper position and to determine its final position in the head. Before the centering tabs 54 are thus seated, however, it is apparent that the four corners 56 will have engaged the side wall 42. As is clear from Fig. 6, then, the emplacement of the magnet assembly 44 to the desired position in the recess 40 causes the corners 56 to be bent downwardly and inwardly. The aforementioned sharpness of the corners 56 enables them to gouge slightly into the side wall 42, and the inherent spring-like resiliency of the backing plate section 50 is effective to wedge the holder 46 firmly into place.

Clearly, there has been described a novel filter assembly which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims.

I claim:

1. A magnet assembly for insertion in a frusto-conical recess, said assembly comprising a block-like permanent magnet and a holder therefor, said holder being formed from a single sheet of resilient non-magnetic material and including a generally rectangular backing plate section of spring-like material, a tab means integral with the backing plate section and bent over a portion of the magnet so as to retain the same against the backing plate section, additional tab means integral with the backing plate section and bent to attitudes which are complementary with the slope of the wall of said recess for limiting the depth of insertion of the magnet assembly in the recess, and corner portions defining the maximum extensions of the backing plate section, said corner portions extending beyond a circle which would circumscribe said several tab means at their juncture with the backing plate section, said corner portions being thereby adapted for forcible engagement with the wall of said recess upon insertion of the magnet assembly therein to a depth which abuts said additional tab means with the wall of the recess.

2. In a fuel filter, a filter head having walls defining a fuel passage, a magnet assembly in said passage comprising a permanent magnet and a holder therefor, said holder comprising a sheet of resilient non-magnetic material providing a rectangular-shaped backing plate section, means on said section securing the magnet thereon, flaps on said section engaging the wall of said passage, and sharp resilient portions on said section resiliently urged into biting engagement with the wall of said passage and coacting with said flaps to resist movement of said holder relative to said head, said flaps being disposed at opposite ends of said section, said sharp resilient portions being located at the four corners of said section, said flaps diverging outwardly from the plane of said section.

3. For use in a fluid filter having walls defining a fuel passage and a socket formed in said passage, the combination of a magnetic type of trap for said socket comprising a magnet and a holder for said magnet including, a planar backing plate section, a plurality of resilient centering tabs formed integrally with and at opposite ends of said backing plate section and disposed at an angle thereto to engage the wall of said socket when the holder is disposed therein with the backing plate section normal to the axis of the socket, said backing plate having sharp resilient corners to be flexed into press-fit biting engagement with the wall of said socket.

References Cited in the file of this patent

UNITED STATES PATENTS

| 1,671,606 | Pierce | May 29, 1928 |
| 2,436,740 | Brooks | Feb. 24, 1948 |
| 2,459,534 | Kennedy | Jan. 18, 1949 |

FOREIGN PATENTS

| 118,569 | Australia | May 30, 1944 |
| 714,254 | Great Britain | Aug. 25, 1954 |
| 719,228 | Great Britain | Dec. 1, 1954 |